United States Patent
Blaze

Patent Number: 6,005,944
Date of Patent: Dec. 21, 1999

[54] SYSTEM AND METHOD FOR CONSTRUCTING BLOCK CIPHERS

[75] Inventor: Matthew A. Blaze, Hoboken, N.J.

[73] Assignee: AT&T Corp, Middletown, N.J.

[21] Appl. No.: 08/800,703

[22] Filed: Feb. 14, 1997

[51] Int. Cl.$^6$ .................................................. H04L 9/00
[52] U.S. Cl. ............................................................. 380/42
[58] Field of Search ............................................. 380/42

[56] References Cited

U.S. PATENT DOCUMENTS

| | | | |
|---|---|---|---|
| 5,307,412 | 4/1994 | Vobach | 380/42 |
| 5,740,249 | 4/1998 | Shimizu et al. | 380/42 |

Primary Examiner—Gail O. Hayes
Assistant Examiner—Paul Nguyen

[57] ABSTRACT

An efficient block cipher that operates on blocks of arbitrarily large size. A block is permuted by recursively using relatively small random functions in an N-round Feistel construction, where N is an integer. The security of the invention is closely related to the difficulty of solving the Numerical Matching with Target Sums problem, an NP Complete problem which cannot presently be solved analytically using known mathematical techniques. The memory required for the cipher's random functions increases linearly with block size, rather than exponentially as with known Feistel constructions. The invention can be efficiently and practically implemented in software at speeds comparable to the speeds of known ciphers.

4 Claims, 2 Drawing Sheets

SYSTEM AND METHOD FOR CONSTRUCTING BLOCK CIPHERS

FIELD OF THE INVENTION

This invention relates to a system and method for constructing block ciphers, and particularly to the recursive use of random functions with the Feistel construction to build a cipher on blocks of arbitrarily large size.

BACKGROUND OF THE INVENTION

Unlike most modern public-key ciphers, whose security relates to some long-studied mathematical problem that is believed to be difficult to solve (e.g., the factoring or finding discrete logarithms of large integers), the security of most modern symmetric-key block ciphers do not relate to any widely-studied, hard-to-solve problems. Rather, block ciphers are generally designed in an ad hoc fashion to resist known cryptanalytic attacks. As a consequence, the design, analysis and implementation of reliably secure block ciphers is regarded as exceptionally difficult, and is often regarded as more of an art than a science.

The lack of a system and method for developing efficient block ciphers whose reliability and security can be understood or expressed analytically has resulted in the deployment of block ciphers whose security properties have been discovered to be considerably weaker than expected. The discovery of a new weakness in a block cipher undermines security of systems in which it is used, and results in inconvenience and economic loss if the discovered weakness is severe enough to warrant replacing the cipher.

A more serious problem arises if the cipher's user is unaware of a weakness that has been discovered by a third party. This weakness may be exploited without the knowledge of the user to undermine the security of the user's systems for an indeterminate amount of time. This can lead to the unauthorized modification of information (such as the dollar amounts of transfers specified by electronic funds transfer (EFT) messages) and/or the disclosure of confidential and sensitive information to unauthorized third parties (e.g., the disclosure of a trade secret.) Such security compromises can cause significant damage to the user and to third parties who rely upon the security of the cipher indirectly (e.g., account holders at a bank that uses EFT secured by the cipher.)

A block cipher with known security properties would eliminate much of the uncertainty surrounding its security. This would substantially reduce the risk of an unexpected weakness, allowing users to rely upon it with more confidence. A cipher with security properties known to be strong would reduce the risk of unauthorized modification and/or compromise of confidential and/or sensitive information. Michael R. Garey and David S. Johnson, *Computers and Intractability: A Guide to the Theory of NP-Completeness.* Freeman, 1979.

Known block ciphers tend to be conceptually complex. They are often characterized by "magic" constants (i.e., apparently arbitrary constants that have a poorly understood effect on the security of the cipher), irregular structures, and awkward bit-level operations that are inefficient and expensive to implement on computers and/or in telecommunications systems. It is virtually impossible to mathematically comprehend the justifications for many of the various parameters in a typical cipher. These features can lead a user to improperly implement the cipher in software and/or hardware. Improperly implementing even a single step in some ciphers can render them far less secure. For example, a single bit change to a DES S-box in the Digital Encryption Standard (DES) cipher usually renders the cipher less secure.

Cryptanalytic attacks against known block ciphers have often been successfully carried out using known mathematical techniques. Eli Biham and Adi Shamir, *Differential Cryptanalysis of the Data Encryption Standard,* Springer-Verlag, 1993. A block cipher that cannot be successfully attacked with known mathematical techniques would be more secure than many known block ciphers.

The goal of a block cipher is to provide a reversible transformation on blocks of bits. More precisely, block ciphers are reversible pseudo random permutations that map each of the $2^n$ possible inputs to a unique n-bit output value. An ideal block cipher would be a completely random permutation, i.e., the only possible representation of the transformation would be a list that completely maps each possible input to an output, and vice versa. This is called a "random function." An example of such a random function for three bit blocks (each of which was selected at random) is as follows:

| INPUT  | 000 | 001 | 010 | 011 | 100 | 101 | 110 | 111 |
|--------|-----|-----|-----|-----|-----|-----|-----|-----|
| OUTPUT | 010 | 111 | 000 | 110 | 100 | 001 | 011 | 101 |

A truly random function is said to be unconditionally secure because there is no correlation between any one subset of mappings and any other, i.e., the most compact representation of the function is simply a list of all of its inputs mapped to outputs. However, the size of such a random function grows exponentially with the number of bits on which the cipher operates. For a block size of $2^n$ bits, a block cipher that operates on two halves of the block requires at least one random function correlating $2^n$ inputs to $2^n$ outputs, and generally more in order to provide meaningful security. This makes random functions impractical to implement for block ciphers.

This problem has been addressed by replacing the use of random functions with pseudo random functions (PRF) in a known block cipher developed by Feistel. H. Feistel, "Cryptography and Computer Privacy." *Scientific American,* Vol. 228, 1973. A PRF is not a truly random mapping of inputs to outputs, but rather a function that generates an apparently random mapping based upon a particular method. Luby and Rackoff showed that if the functions used in an at least four-round Feistel construction are themselves secure, then the resulting permutation is secure. M. Luby and C. Rackoff, "How to Construct Pseudo random Permutations from Pseudo random Functions." *SIAM J. Comput.,* 17 (1988), 373–386. However, Luby and Rackoff provided no information on how to determine if an arbitrary PRF is in fact secure. Thus, a system and method that uses functions known to be secure in an at least four-round Feistel construction will produce permutations that are known to be secure. The Feistel primitive is shown symbolically as follows:

$X=A|B$ /*cleartext*/

$A=A+f_e$ $B=B+A$ $X=B|A$ /*ciphertext*/

$X=A|B$ indicates that block of data X has two concatenated halves A and B ("|" indicates concatenation). Entry $f_e$ of PRF f is added in this embodiment bitwise modulo-2 (represented by the "+" operator) to A. The result is assigned to A, which is then added to B modulo-2, resulting in a new value for B. The positions of A and B are switched and concatenated to form a permuted X=B/A. The primitive can repeated again any number of times using a different PRF each time. Each instance that the primitive is invoked is called a "round." A symbolic representation of a four round Feistel construction is as follows:

$X=L|R$ /*cleartext*/

$R=R+f_1(L)$ $L=L+f_2(R)$ $R=R+f_3(L)$ $L=L+f_4(R)$ $X=L|R$ /*ciphertext*/

Here, $f_1$, $f_2$, $f_3$ and $f_4$ are secret pseudo random functions. A four round, 2n-bit Feistel construction using four n-bit functions is shown in FIG. 1. In step 1, a 2n-bit block X is divided into a right half R and a left half L. In step 2, the n-bit left half L of the 2n-bit block is permuted with a PRF $f_1$ and added to the n-bit right half R of the block. The result becomes the new right half R. In step 3, the permuted right half R is permuted with another PRF $f_2$ and added to left half L. The result becomes the new left half L. In step 4, the L is permuted with another PRF $f_3$ and added to R, the result of which becomes the new R. In step 5, R is permuted with PRF $f_4$ and added to L, the result of which becomes the new L. In step 6, an enciphered block X=L|R is obtained.

In order to decipher a block enciphered with the Feistel primitive, the order of the steps of the primitive are reversed and carried out on the enciphered block. This is shown for the Feistel primitive as follows:

$X=B|A$ /*ciphertext*/

$B=B+A$ $A=A+f_e$ $X=A|B$ /*cleartext*/

In order to decipher blocks enciphered with multiple rounds, the rounds should be reversed in reverse order, the most recently used round first. In other words, if the primitive is applied in the sequence r1, r2, . . . , r5, the reverse primitive should be applied in the order r5, r4, . . . , r1 to decipher the block. This is shown for a four round Feistel construction cipher in FIG. 2, and as follows:

$X=L|R$ /*ciphertext*/

$L=L+f_4(R)$ $R=R+f_3(L)$ $L=L+f_2(L)$ $R=R+f_1(L)$ $X=L|R$ /*cleartext*/

The Feistel construction cipher is advantageous because its security (using at least 3 rounds, more preferably at least 4 rounds, and most preferably at least 6 rounds) is closely related to the difficulty of solving the Numerical Matching with Target Sums (NMTS) problem, an NP-Complete problem which cannot be analytically solved using known mathematical techniques. In other words, the only known way to compromise a Feistel construction cipher of three or more rounds is by brute force (e.g., trying all possibilities.) The difficulty of succeeding in a brute force attack is related to the block size of the cipher, i.e., the larger the block size, the greater the security of the cipher is likely to be. The disadvantage of the Feistel construction is that it is impossible to practically implement for block sizes sufficiently large to render a secure cipher. This is due to the large computer-readable memory requirements imposed by a Feistel construction cipher for a secure block size.

As discussed above, the number of entries in a PRF needed to implement a Feistel primitive on a block of 2n bits is $2^n$. The number of bits of PRF needed is therefore n2n. For a construction using N rounds of the primitive on each block, Nn2n bits of PRF are required. It is important to keep the PRF confidential, because an unauthorized third party could use the PRF with the primitive reversed to decipher the block.

The basic 4-round Feistel construction is not suitable in practice for use as a practical block cipher because it requires $4n(2^n)$ bits of secure (secret) memory to operate cryptographically on a block of length 2n. This limits the economical and practical application of the four round Feistel construction to 16 or 32 bit block sizes on known computers. For example, a four-round Feistel construction on a block of 64 bits requires around $2^{32}$ bits of storage memory (over 3 billion bits, or about 375 Mb), which exceeds the ready storage capacity (e.g., RAM) of many present day computers. For an even larger block cipher of 128 bits, $2^{64}$ bits (over $10^{19}$ bits) are required, roughly equal to the number of seconds in the age of the universe as it is presently understood.

A larger block size in a Feistel construction block cipher generally yields a more secure cipher because the PRFs of small block size ciphers can be easily deduced using known cryptanalytic techniques implemented on computers. This becomes more clear by considering a block size of three bits. Each input entry for the PRF has only eight possible output entries, as can be seen in the table above. All of the output possibilities may be easily tried for the inputs using a computer on a 3-bit block cipher, and the cleartext can be easily recovered. The present state of art mandates a minimum block size of 64 bits in order to produce a secure cipher, a block size which, as shown above, is impractical to implement using the four round Feistel construction.

It should also be recalled that Luby and Rackoff showed that an at least four-round Feistel construction is secure if the underlying functions are themselves secure, but no information was provided on determining the security of underlying PRFs. Hence, a practical Feistel construction using at least four rounds and whose underlying functions are known to be secure (e.g., whose underlying functions are random functions, rather than PRFs) would produce secure permutations. However, the constraints of computer readable memory in modern computers prevent the implementation of a four round Feistel construction using truly random, unconditionally secure functions.

In summary, a better block cipher would possess the advantage of having known security properties such as those disclosed by Luby and Rackoff for the Feistel construction, and could be efficiently and practically implemented on known computers.

SUMMARY OF THE INVENTION

The present invention is a block cipher on an arbitrarily large block size of $n=2^j w$ bits, j being an integer, by recursively using $2^{2j}$ w-bit random functions in an N-round Feistel construction, where N is preferably at least three, more preferably at least four, and most preferably at least six.

The security of the present invention is advantageously related to the difficulty of solving an NP complete problem called the Numerical Matching with Target Sums problem, which cannot be analytically solved with known mathematical techniques.

The present invention requires an amount of memory for the random functions that increases linearly with block size. This represents a substantial savings over the memory required for the random functions in a conventional Feistel construction, for which the memory requirement increases exponentially with block size. The present invention advantageously operates efficiently for block sizes which would be impossible to implement using the conventional Feistel construction on known computers.

Further, the speed of the present invention implemented in software is comparable to the speed of known ciphers, even when the present invention is implemented with larger block sizes. The present invention advantageously provides a fast, efficient, and economical block cipher with known security properties for blocks of arbitrarily large size.

DETAILED DESCRIPTION

The present invention is a block cipher that recursively uses small random functions in a Feistel construction to advantageously produce secure permutations on arbitrarily large block sizes using practical and efficient amounts of computer readable memory. The speed of the present invention implemented in software on known computers is comparable to that of known ciphers.

A pseudo code embodiment of the present invention, implemented as a program called Turtle, is as follows:

```
Turtle(X,N) = {
    if length(X) = w
    {
        m = m + 1
        return f_m(X)
    }
    else {
        p = N
        while p is greater than zero {
            R = X_right
            L = X_left
            R = R ⊕ Turtle(L,N)
            X = R|L
            p = p - 1
        }
    }
}
```

$X_{left}$ denotes the left half of paremeter bitstring X; $X_{right}$ denotes the right half. $\oplus$ indicates a bitwise exclusive-OR operation, and | denotes bitstring concatenation. $f_i$ denotes the ith function in a table of w-bit random functions. m is a global variable initialized to zero and incremented for each block. N is a parameter denoting the number of rounds.

Block size n is expressed as an multiple of w, i.e., n=kw. In accordance with the present invention, k is of the form $k=2^j$, where j is an integer greater than zero. $k^2$ (or $(n/w)^2$) functions are required for an n-bit cipher according to the present invention. An n-bit cipher is a cipher that operates on blocks of data of length n bits. This compares advantageously to the $N2^n$ pseudo random functions required by a conventional N-round, n-bit Feistel construction cipher. The number of functions required in a Feistel construction increases exponentially with the number of bits of the cipher, rapidly placing impractical demands upon computer readable memory resources as n grows. The number of functions needed by the present invention grows linearly with block size, thus placing more modest demands for memory as block size increases, and therefore being practical to implement.

An embodiment of a four-round (N=4) implementation of the present invention is as follows:

```
Turtle(X) = {
    if length(X) = w
    {
        m = m + 1
        return f_m(X)
    }
    else {
        R = X_right
        L = X_left
        R = R ⊕ Turtle(L)
        L = L ⊕ Turtle(R)
        R = R ⊕ Turtle(L)
        L = L ⊕ Turtle(R)
        X = L|R         /* in another embodiment, X =
                           R|L */
    }
}
```

Figure 3:
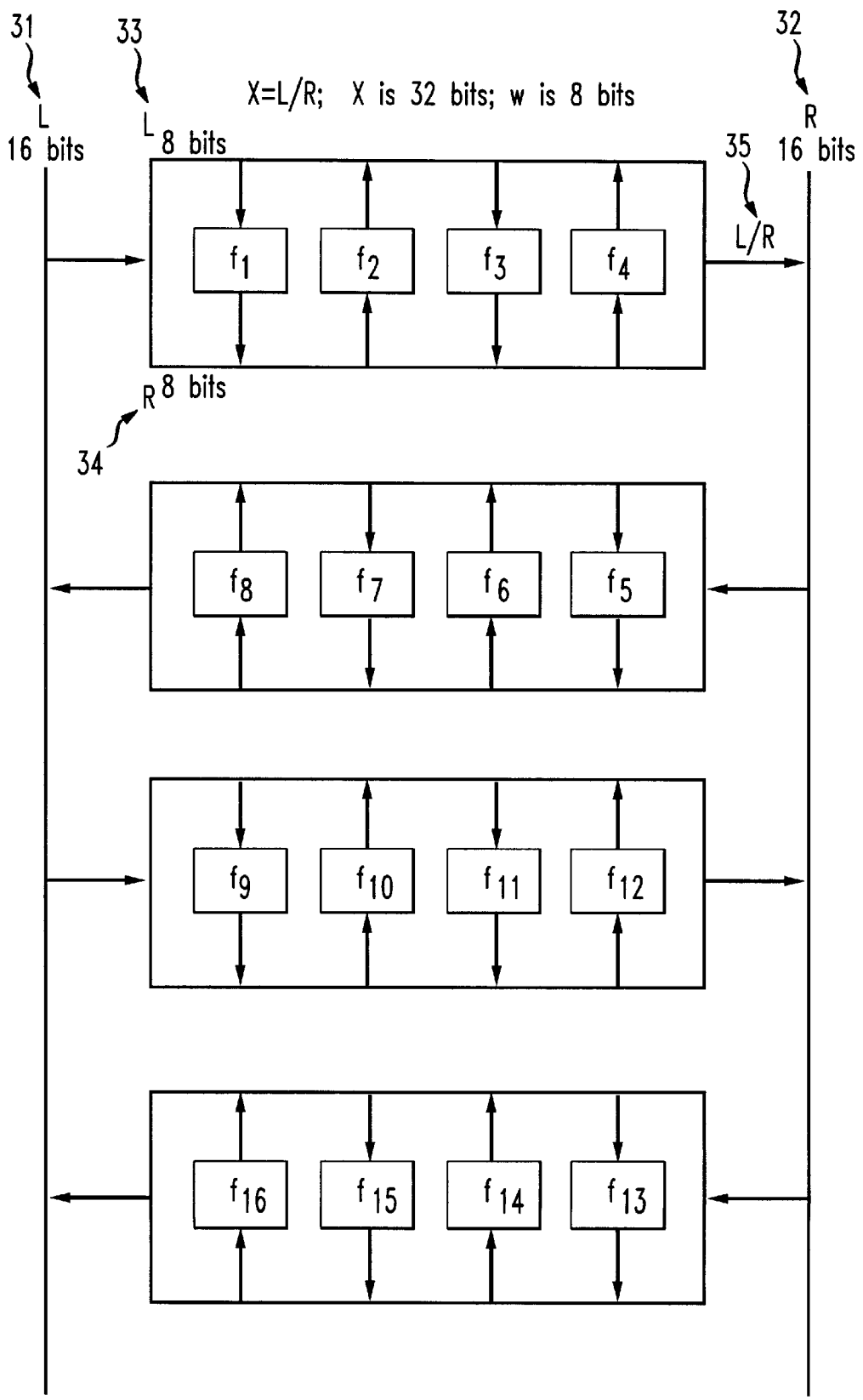
FIG. 3 shows an embodiment of the present invention for blocks of 32 bits in length and random functions of eight bits in length.

An embodiment of the present invention for a block size of 32 bits and using random functions of 8 bits is shown in FIG. 3. This figure shows the recursive nature of the present invention, where each thirty two bit Feistel round is composed of four sixteen bit Feistel rounds.

First, the block is divided into a 16-bit left half L 31 and a 16-bit right half R 32. Bitstring L 31 is too long at 16 bits in length to add to any entry of the random functions $f_1 \ldots f_{16}$ which are only 8 bits long. Thus, L 31 is itself halved into an eight bit left half which is assigned to L 33 and an eight bit right half which is assigned to R 34. Eight bit L 33 and eight bit R 34 share the variable names of sixteen bit L 31 and sixteen bit R 32 because of the recursive nature of the present invention.

Figure 1:
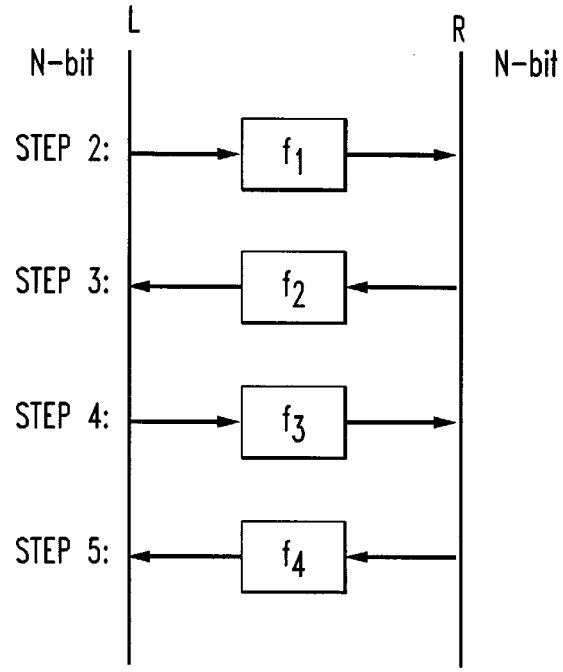
FIG. 1 shows a prior art embodiment of the four-round Feistel construction.
Figure 2:
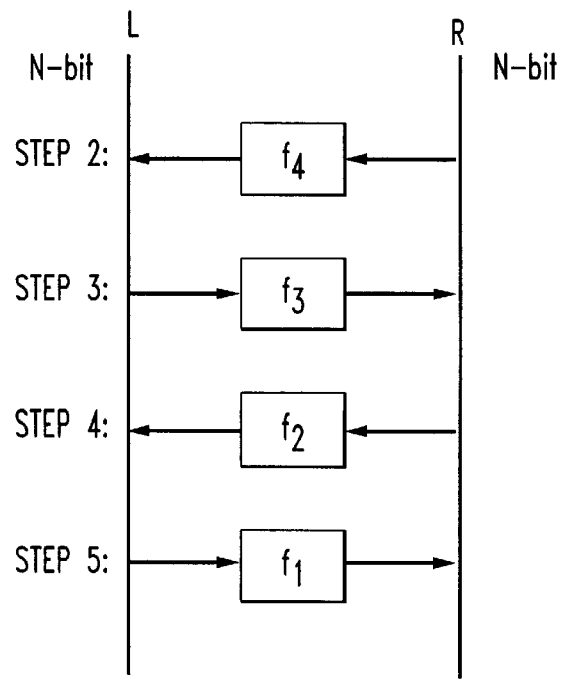
FIG. 2 shows a prior art embodiment of the four-round Feistel construction for deciphering blocks enciphered using the cipher shown in FIG. 1.

The 8-bit L 33 and R 34 blocks are the correct size for applying the 8-bit random functions, and they are permuted through a sixteen bit, four round Feistel construction of the kind shown in FIG. 1 using the random functions $f_1 \ldots f_4$. The resulting (permuted) 8-bit L 33 and R 34 are concatenated to form sixteen bit bitstring L|R 35, which is then added to the 16-bit bitstring R 32, thus carrying out the first round 36 of the thirty two bit, four round Feistel construction.

Thus, in this embodiment, the present invention uses sixteen bit, four round Feistel constructions to create sixteen bit pseudo random functions for carrying out a thirty two bit, four round Feistel construction on blocks of the original cleartext. As can be seen from FIG. 3, 16 random 8-bit functions are required to implement this embodiment. Hence, the amount of computer memory required is to implement the embodiment is approximately 4 Kb. This represents a substantial savings over the approximately 524 Kb that is required by the conventional thirty two bit, four round Feistel construction using random functions.

The present invention for an n-bit block size and using w-bit random functions requires $w2^w(n/w)^2$ bits of computer readable memory to store the random functions. Thus, if C(n/w) indicates a cipher of n-bits using w-bit random functions, a C(8/64) cipher in accordance with the present invention uses 64 random functions and a total of 131,072 (16K bytes) bits of key material. This represents a substantial savings over the approximately 375 Mb of memory required by the conventional four round Feistel construction using random functions. C(8/128) uses 64K bytes of key material. The security of a cipher in accordance with the present invention would generally be stronger for ciphers with larger block sizes and longer length random functions.

The speed of carrying out a cipher implemented in software in accordance with the present invention is advantageously comparable to that of other block ciphers, provided enough memory is available to hold the key without paging. For example, the reference implementation of Turtle 8/64 encrypts approximately 60,000 blocks per second on a 100 MHz Pentium.

The present invention carries out pseudo random permutations on blocks of data of arbitrarily large size using practical amounts of computer readable memory. These permutations are suitable for use as ciphers, particularly when large block sizes are used. The security of the present invention is advantageously closely related to the difficulty of solving an NP complete problem. The present invention provides a fast cipher on large block sizes that is practical to implement, and is likely to be highly secure given the present state of mathematical knowledge on solving NP complete problems.

What is claimed is:

1. A method for carrying out a block cipher as a pseudo random permutation on a block of length $2^j w$ bits, j being an integer, by using $2^{2j}$ random functions each w bits in length in a recursive N-round Feistel construction, where N is an integer greater than zero.

2. A method for carrying out a block cipher as a pseudo random permutation on a bitstring X of length $n=2^j w$ bits, j being an integer, for N rounds, by using $2^{2j}$ random functions each of length w bits, comprising the steps of:
   a. initializing the value of integer m to 1, m denoting the index of a random function, m assuming values from 1 to $2^{2j}$;
   b. receiving as a parameter bitstring X and the number of rounds N, and determining the length of parameter bitstring X;
   c. if the length of parameter bitstring X is equal to w, then permuting parameter X to $f_m(X)$ and incrementing the value of integer m by one, $f_m$ being a random function of length w bits;
   d. if the length of parameter X is not equal to w, then initializing the value of integer p to be equal to parameter N;
   e. if the value of p is greater than zero, then carrying out the steps of:
      i. dividing the parameter bitstring X into a right half R and a left half L such that parameter X=L|R;
      ii. assigning to parameter X the value of L and carrying out step b and the steps following step b in sequence on parameters X and N;
      iii. adding to R the value for parameter X and assigning the resulting sum to R;
      iv. assigning to parameter X the value of R|L;
      v. decrementing p by 1; and
      vi. carrying out step e and the following steps in sequence.

3. A method for carrying out a four round block cipher as a pseudo random permutation on a block X of length $n=2^j w$ bits, j being an integer, using $2^{2j}$ random functions each of length w bits, comprising the steps of:
   a. determining the length of block X;
   b. if the length of block X is equal to w, then assigning to X the value $f_m(X)$ and incrementing the value of integer m by one, $f_m$ being a random function of length w bits;
   c. if the length of X is not equal to w, carrying out the steps of:
      i. dividing the current bitstring X into a right half R and a left half L;
      ii. assigning to R that value that results from adding to R the value obtained by assigning the value of L to X and carrying out step a and the steps following step a in sequence;
      iii. assigning to L the value that results from adding to L the value obtained by assigning the value of R to X and carrying out step a and the steps following step a in sequence;
      iv. assigning to R the value that results from adding to R the result obtained by assigning the value of L to X and carrying out step a and the steps following step a in sequence; and
      v. assigning to L the value that results from adding to L the result obtained by assigning the value of R to X and carrying out step a and the steps following step a in sequence.

4. A system for cryptographically processing data, comprising:
   a. a first processor with computer readable memory, said processor encrypting data by permuting blocks of the data, each block of length $2^j w$ bits, j being an integer, by using $2^{2j}$ random functions, each function w bits in length, in a recursive N-round Feistel construction, where N is an integer greater than zero;
   b. a communications channel; and
   c. a second processor with computer readable memory, said second processor decrypting the encrypted blocks of data received from said first processor through said communications channel by carrying out in reverse order the steps of the N-round Feistel construction used by said first processor.

* * * * *